United States Patent Office 3,029,658
Patented Apr. 17, 1962

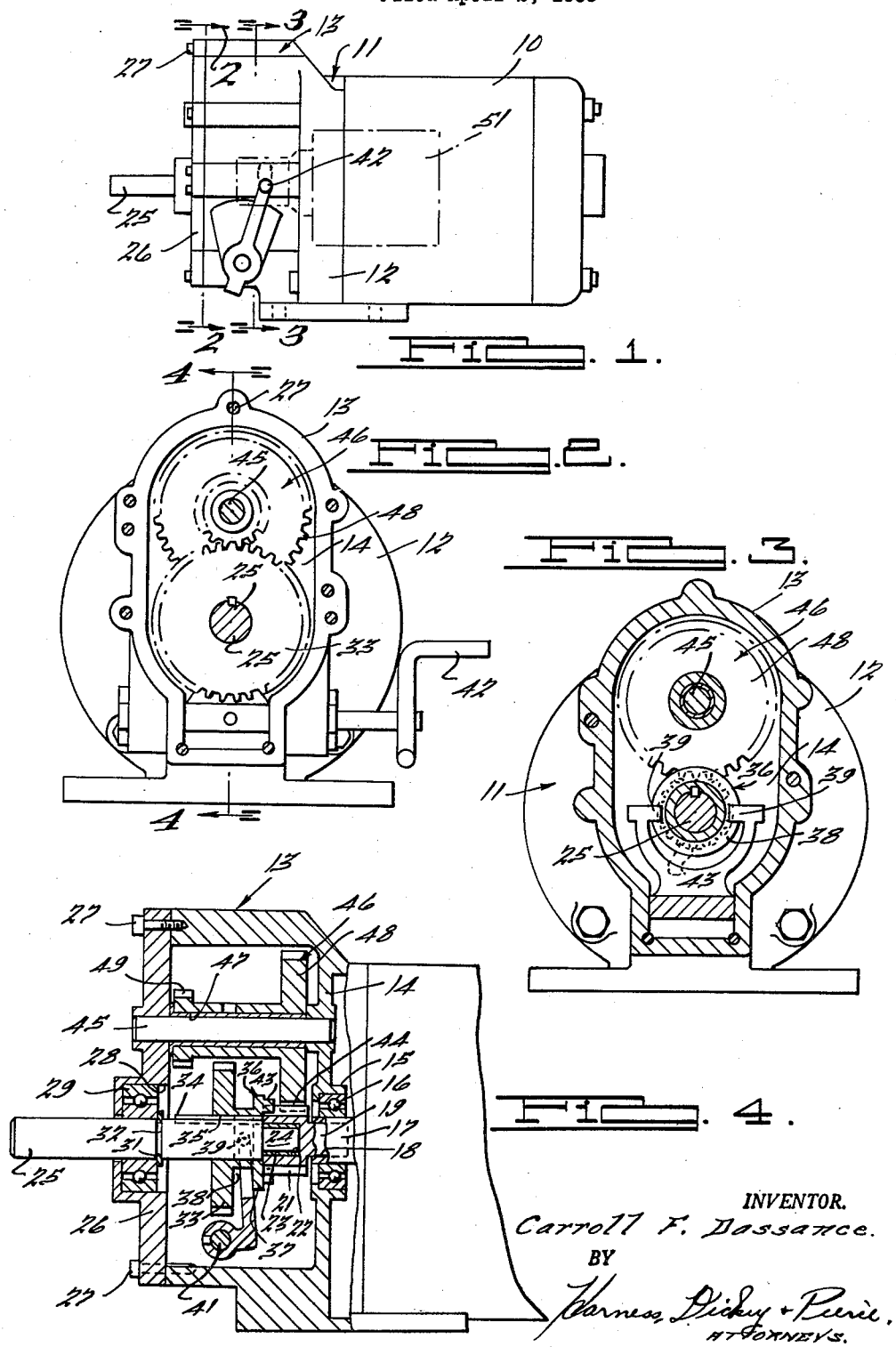

3,029,658
SPEED REDUCING UNIT
Carroll F. Dassance, 23269 Clairwood Ave.,
St. Clair Shores, Mich.
Filed Apr. 2, 1959, Ser. No. 803,669
2 Claims. (Cl. 74—343)

This invention relates to speed reducing units, and particularly to a unit by which the speed of operation of a machine may be changed in a rapid manner.

While most metal cutting machines are provided with means for driving the tool at different speeds, the present invention embodies means to further change the speeds by changing the drive speed of the motor which thereby affects all of the speeds at which the tool of the machine can be driven. Thus, for example, if a lathe is provided with a belt drive which may be changed to provide four steps of speed to a tool from a motor driven at a rated speed, all of such speeds may be substantially lowered or raised by changing the output speed of the motor through gear and clutch means which readily shifts from a direct drive to a gear drive of different speeds. The arrangement is such that the gears employed for the change in speed may be readily changed to produce different ratios of speeds so that the exact speed or ratio of speeds to drive a tool may be easily and readily provided. A speed reducing element is directly attached to the motor and requires very little space so that the motor and reducing unit may be supported on the standard motor mount of a machine. The device is so mounted that the clutch control lever is accessible to an operator for manual actuation or which may be operated by a solenoid.

Accordingly, the main objects of the invention are: to provide a speed reducing unit on a motor which changes the input speed to the drive of a machine which doubles the drive through one or a plurality of different speeds for driving a tool; to provide a speed reducing unit on a motor which may be supported on a standard motor mount and which is readily shifted from one speed to another to increase the efficiency and productivity of the machine; to provide a two-speed motor drive of compact design for installation on new or old machines which may be supported directly on a standard motor mount on the machine; to provide a drive motor with a device by which two different speeds may be employed to drive through the various speed reducing elements of the machines, and, in general, to provide a speed reducing device as a drive element of a machine which is simple in construction, positive in operation, and economical of manufacture.

Other objects and features of novelty of the invention will be specifically pointed out or will become apparent when referring, for a better understanding of the invention, to the following description taken in conjunction with the accompanying drawing, wherein:

FIGURE 1 is a view in elevation of a speed reducing unit embodying features of the present invention;

FIG. 2 is an enlarged sectional view of the structure illustrated in FIG. 1, taken on the line 2—2 thereof;

FIG. 3 is an enlarged sectional view of the structure illustrated in FIG. 1, taken on the line 3—3 thereof, and FIG. 4 is a broken sectional view of the structure illustrated in FIG. 2, taken on the line 4—4 thereof.

A motor 10 has the forward bell end removed and a casting 11 substituted therefor having a rear section 12 the shape of the bell end and a housing portion 13 extending forwardly thereof. A rear wall 14 of the housing portion 13 has an annular flange 15 which receives a ball bearing 16 for supporting the forward enlarged end of the shaft 17 of the motor. The enlarged end has a recess 18 therein which receives the stub shaft 19 of a pinion 21 which extends forwardly in extension thereof. The pinion has a central aperture 22 containing a bearing sleeve 23 in which the reduced end 24 of a shaft 25 is journaled. A cover plate 26 encloses the front face of the housing 13 when secured thereto by a plurality of screws 27. A recess 28 in the cover plate supports a ball bearing 29 through which the shaft 25 extends, being secured against outward movement by a spring washer 31 disposed in a slot 32 in the shaft.

A gear unit 33 is slidably disposed on the shaft 25 for movement longitudinally thereof while being maintained in driving relation therewith by a key 34 mounted in a slot in the shaft and extending into a slot 35 in the gear and in the extension portion 36 of the unit. The extending portion 36 has a flange 37 which forms a recess 38 in which a pair of oppositely disposed pins 39 extend. The pins are a portion of a bifurcated clutch arm which is mounted on a shaft 41 disposed transversely of the housing 13 in position to extend outwardly from one, the other, or both sides thereof. Lever means 42 is secured to one end of the shaft 41 by which the shaft may be rotated to angularly move the pins 39 for moving the gear 33 longitudinally of the shaft 25. The flange 37 has a plurality of V-shaped teeth 43 disposed thereon in position to extend between the teeth 44 of the pinion 21.

In the upper portion of the housing 13, a shaft 45 is mounted in nonrotative relation to the rear wall and to the cover plate 26. A cluster gear 46, having a bearing sleeve 47 therein, is mounted on the shaft 45 for free rotation thereon. The cluster has a gear 48 on the rear end which meshes with the teeth of the pinion 21. The forward end of the cluster has a pinion 49 thereon, the teeth of which mesh with the teeth of the gear 33 when the gear is shifted forwardly toward the plate 26. The gear 48 is at all times in mesh with the gear 21 and when the teeth 43 are disconnected from the teeth 44 of the pinion 21, the shaft 25 is not driven. When the teeth 43 are moved rearwardly to be disposed between the teeth 44, a clutching action occurs, causing the driven pinion 21 to drive the gear 33 and the shaft 25 directly at normal motor speed. When the gear 33 is moved forwardly by the operation of the lever 42, the teeth of the gear 33 will mesh with the teeth of the pinion 49. The pinion 21 driving the gears 48, 49 and 33 will drive the shaft 25 at a substantial change in speed which, in the present arrangement, is a substantial reduction in speed. This reduction in speed may be varied by changing the diameter and number of teeth of the gears 33, 48 and 49 and the pinion 21. Through the change of the diameter and number of teeth of the gears and pinion, the speed of rotation of the shaft is increased or decreased relative to the speed of the motor. Very little time is required to change speeds which may be stepped up or stepped down and varied by changing the gears within the housing 13.

The motor 10, with the housing 13 thereon, occupies such a small increase in space that it may be mounted on the standard mounting fixture of a machine and may be applied to a new or old machine. A solenoid 51 is outlined in dotted line in FIG. 1 as being attached to the lever 42 so that it may throw the lever and change the drive to produce the standard motor speed or a speed produced through the gear system. It is to be understood that the lever 42 and also the solenoid 51 may be applied to either side of the device so as to be available to the operator for manual movement or to locate the solenoid in a position which will not interfere with other parts of the machine.

Thus, it will be seen that a motor drive change speed unit is provided that may be substituted for the standard motor drive of a machine without any change in the mounting means therefor. The drive may be mounted in the base housing of a machine or outside of the housing at the front, rear or ends of the machine in place of a standard motor drive. Besides the plurality of speed changes supplied with a machine when driven at the standard speed of the motor, the use of the present motor and speed changing system doubles the speeds at which the tool of the machine may be driven. The speed changing system of the motor may increase or decrease the motor speed and the degree of increase and decrease may be varied by changing the gears of the system.

What is claimed is:

1. A speed reducing unit comprising a housing having parallel spaced shafts, a cluster gear embodying a central sleeve portion with a gear in fixed relation thereto at each end of the sleeve with the latter freely rotatable on one of said shafts, a driven pinion having teeth in mesh with the teeth of one of the gears of said cluster which are of shorter length than the teeth of the pinion, a second cluster embodying a central sleeve portion slidable upon the other said shaft having a gear with radial teeth at one end meshing with the teeth of the other gear of the first cluster in one position for driving said other shaft through a key connection therewith, and a gear having axially disposed clutch teeth at the other end of the slidable sleeve extending between the teeth of said driven pinion in the other position of said second cluster gear for driving said other shaft directly with the pinion.

2. A speed reducing unit comprising a housing having parallel spaced shafts, a cluster gear embodying a central sleeve portion with a gear in fixed relation thereto at each end of the sleeve with the latter freely rotatable on one of said shafts, a driven pinion having teeth in mesh with the teeth of one of the gears of said cluster which are of shorter length than the teeth of the pinion, a second cluster gear embodying a central sleeve portion slidable upon the other said shaft having a gear with radial teeth at one end meshing with the teeth of the other gear of the first cluster in one position for driving said other shaft through a key connection therewith, a gear having axially disposed clutch teeth at the other end of the slidable sleeve extending between the teeth of said driven pinion in the other position of said second cluster gear for driving said other shaft directly with the pinion, and means engaging the central sleeve portion of said second cluster gear for shifting said second cluster gear into the said two driving positions.

References Cited in the file of this patent

UNITED STATES PATENTS

| | | |
|---|---|---|
| 1,101,539 | Halblieb | June 30, 1914 |
| 1,439,402 | Buckwalter | Dec. 19, 1922 |
| 1,935,211 | Krohn | Nov. 14, 1933 |
| 2,191,629 | Scott et al. | Feb. 27, 1940 |
| 2,487,735 | Sherman et al. | Nov. 8, 1949 |
| 2,936,648 | Barnes | May 17, 1960 |

FOREIGN PATENTS

| | | |
|---|---|---|
| 766,734 | France | Apr. 16, 1934 |
| 773,595 | France | Sept. 3, 1934 |